Sept. 30, 1941.    R. E. CLARKE    2,257,544
CALCIUM MAGNESIUM CARBONATE PRODUCT AND PROCESS OF MANUFACTURE
Filed Dec. 27, 1937
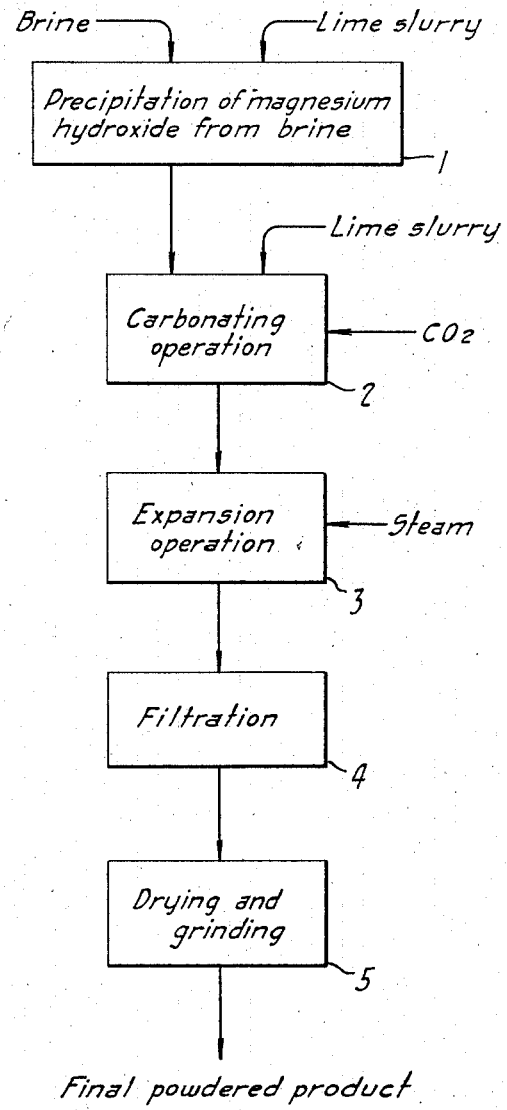
INVENTOR.
Robert E. Clarke
BY
ATTORNEY.

Patented Sept. 30, 1941

2,257,544

UNITED STATES PATENT OFFICE 2,257,544

CALCIUM MAGNESIUM CARBONATE PRODUCT AND PROCESS OF MANUFACTURE

Robert E. Clarke, Palo Alto, Calif., assignor to Marine Magnesium Products Corporation, South San Francisco, Calif., a corporation of Delaware Application December 27, 1937, Serial No. 181,729

6 Claims. (Cl. 23—66)

This invention relates generally to calcium-magnesium carbonate products and their manufacture, and particularly to products of a chemical nature similar to natural dolomite.

Natural dolomite is generally accepted as a distinct double salt of calcium magnesium carbonate, corresponding to the formula

$$CaMg(CO_3)_2.$$

There are many industrial uses for a light and relatively pure dolomitic material including particularly use as a heat insulating medium, as a filler, neutralizer, pigment, and for pharmaceutical and cosmetic use. The principal disadvantages of natural dolomite are its lack of uniformity with respect to both physical characteristics and chemical composition and its relatively high apparent density when in powdered form, usually from 70 to 95 lbs. per cubic foot and its impurities such as iron, silica, manganese, and other organic and inorganic matters. In many industrial applications, lack of purity and chemical and physical uniformity is of serious consequence, because even slight variations may result in serious consequences to an industrial process, or cause deleterious variations to a final product in which the material appears.

It is an object of the present invention to provide a simple process for the manufacture of a calcium-magnesium carbonate product, having many of the desirable chemical properties of natural dolomite, without the disadvantage of lack of uniformity. It is a characteristic of the present process that both the chemical and physical characteristics of the final product can be closely controlled to produce a degree of uniformity not heretofore available.

Another object of the invention is to provide a calcium-magnesium carbonate product having a low apparent density, that is, extreme lightness. In carrying out the present process I have been able to produce a calcium-magnesium carbonate product having an apparent density on the order of 4 to 8 lbs. per cubic foot.

Further objects of the invention will appear from the following description in which certain embodiments of the invention have been set forth in detail in conjunction with the accompanying drawing.

My process consists generally in carbonating a hydrous slurry consisting of a mixture of calcium hydroxide and magnesium hydroxide in water. Following the carbonating operation the mixture is expanded by application of heat, to form a calcium-magnesium carbonate. The hydrous slurry is made up by mixing a slurry of magnesium hydroxide, with a prepared lime slurry. Following expansion the material can be purified by washing and dehydrated to form a final dried product.

A suitable magnesium hydroxide to employ is one prepared by the precipitation of magnesium hydroxide from a brine containing convertible magnesium salts. The brine can be comparatively concentrated, as for example inland brine or bittern waters, or it may be one prepared synthetically. Instead of such brines, I prefer to use sea water, because it is a cheap inexhaustible source of supply, and because by proper procedure I can obtain a hydrous or amorphous form of magnesium hydroxide. In order to minimize contamination of the precipitated magnesium hydroxide, the brine can be subjected to suitable pre-treatment for the removal of foreign material. For example it can be treated with suitable reagents, followed by filtration or percolation through sand beds.

Referring to the accompanying flow sheet of the drawing, step 1 represents the precipitating operation in which the brine is contacted with an alkaline solution for the precipitation of magnesium hydroxide. Assuming that sea water is the source of brine employed, I prefer to follow the procedure disclosed and claimed in co-pending application Serial No. 709,159, filed Jan. 31, 1934. As disclosed in said Chesny application a lime slurry is made up by slaking a highly reactive lime with water, with rapid agitation to produce a slurry substantially free of large calcium hydroxide crystals, and with the solid phase calcium hydroxide in relatively finely divided form. Also as disclosed in said Chesny application the reaction between the lime slurry and the brine is carried on in such a manner as to produce relatively rapidly settling flocks of hydrous or amorphous magnesium hydroxide.

The settled magnesium hydroxide slurry, produced as described above, can if desired be subjected to washing for the purpose of removing impurities. However, purification at this point is unnecessary, because as will be presently described it is a relatively simple matter to wash the calcium-magnesium carbonate product produced, before final drying of the same. Therefore assuming that washing at this stage of the process is omitted, magnesium hydroxide slurry is supplied to the carbonating operation 2, where it is mixed with an additional amount of lime slurry, in a suitable carbonating kettle.

The magnesium hydroxide slurry as supplied to the carbonating operation, may vary with respect to the percentage of solids, although it is preferably comparatively concentrated. In practice good results are secured by using a slurry containing from about 4 to 6% solids.

The lime slurry can be one prepared particularly for the carbonating operation, or may conveniently be the same lime slurry employed for the precipitating and settling operation 1. In practice and assuming that the magnesium hydroxide slurry employed contains from say 4 to 6% magnesium hydroxide, the lime slurry may contain from 5.1 to 7.4% calcium hydroxide formed by slaking from 3 to 4.6 lbs. of calcium oxide with about 10 gallons of water. The combined mixture of magnesium hydroxide and lime slurry, supplied to the carbonating operation 2, should afford a slurry containing from about 4.5 to 6.7% solids.

The two slurries as supplied to the carbonating operation 2, are so proportioned as to afford equal mols of calcium and magnesium hydroxides. For example this relationship is satisfied if 100 gallons of magnesium hydroxide slurry, containing 34 lbs. of magnesium hydroxide, are employed, together with 100 gallons of lime slurry, containing 43 lbs. of calcium hydroxide. It will be apparent that I can depart from these proportions in instances where an equimolecular ratio is not necessary or may not be desired.

The mixture referred to above is now carbonated, as by introduction of carbon dioxide gas. Instead of using a pure source of gas it is possible to use flue gases or other gaseous products, relatively rich in available carbon dioxide. During carbonation the material is subjected to ordinary atmospheric pressure. While if desired, the temperature during carbonation may be controlled within certain limits, in order to facilitate uniformity of the final products, no particular control is necessary to produce a product of extreme lightness. Ordinary atmospheric temperature will give good results, and preferably the temperature is maintained well below 60° C. In general the carbonating operation need not be extended over a long period of time. For example good results have been secured by a period of carbonation in the neighborhood of about 4½ hours.

At the completion of the carbonating operation 2, the carbonated mixture is subjected to an expansion operation 3, which can be carried out with separate equipment, or in the same equipment used for carbonation. Thus if desired the material may remain in the carbonating kettle, and steam introduced into the material until the temperature reaches from 85 to 90° C., after which further supply of heat is discontinued. Rapid liberation of carbon dioxide occurs and is accompanied by a tremendous expansion of the material. In general the expansion can be completed in a period of about 15 to 25 minutes.

After the expansion operation and assuming particularly that a powdered and relatively pure material is required, the expanded slurry is passed to the filtration operation 4, where it is removed from the accompanying water, as by means of continuous filtration equipment of the Oliver type. During this filtration operation the filter cake may be washed one or more times, for removal of various impurities.

The filter cake is now supplied to a drying operation 5, which may make use of any conventional drying equipment, following which the dried cake can be ground to form a final powdered product.

The final product is of extreme lightness, and as previously pointed out, may have an apparent density as low as 4 to 8 lbs. per cubic foot. The individual particles are extremely small, and under the microscope the material shows no normal magnesium carbonate crystals.

It will be apparent that the process described above can be carried out for the large scale production of a material having the desirable properties of natural dolomite, without undesirable properties, such as presence of impurities and lack of uniformity. The process can be controlled so as to facilitate duplication of results over long periods of operation, whereby the properties of the final product can be predicted with certainty. At commencement of carbonation the slurry contains amorphous magnesium hydroxide in suspension and solution, together with calcium hydroxide in suspension and solution.

I have previously pointed out that it is possible to purify the magnesium hydroxide slurry, before the carbonating operation. Such purification can conveniently be carried out by use of washing towers such as disclosed and claimed in Farnsworth Patent No. 2,019,488. Assuming that such a purified magnesium hydroxide slurry is employed, after the carbonating and expanding operations the resulting slurry can be directly reduced to a powdered product by a spray-drying operation, or conventional drying operation. Such an alternative method of manufacture may be desirable where spray-drying equipment is available, and also where equipment for the washing and purification of magnesium hydroxide slurry may be available for the manufacture or other purified products.

I claim:

1. In a process for the manufacture of a calcium-magnesium carbonate product, mixing a slurry of amorphous magnesium hydroxide with a lime slurry, carbonating the mixture at atmospheric pressure, and then expanding the mixture by application of heat to form a carbonate.

2. In a process for the manufacture of a calcium-magnesium carbonate product, mixing a slurry of amorphous magnesium hydroxide with a lime slurry, the amounts being such that the magnesium hydroxide and the calcium hydroxide are present in substantially equal molal proportions, carbonating the mixture at atmospheric pressure, and then expanding the mixture by application of heat to form a carbonate.

3. In a process for the manufacture of a calcium-magnesium carbonate product, separately forming two slurries, one being of magnesium hydroxide and water and the other being a slurry of calcium hydroxide in water, mixing the slurries together, contacting the mixture with carbon dioxide gas at atmospheric pressure while the temperature of the same is below 60° C., and then heating the carbonated mixture to form a carbonate.

4. In a process for the manufacture of a calcium-magnesium carbonate product, the steps of mixing a slurry of amorphous magnesium hydroxide with a lime slurry, carbonating the mixture at atmospheric pressure, and then expanding the mixture by application of heat to form a carbonate, said carbonating and expanding steps being carried out in the absence of a catalyst like ammonia.

5. In a process for the manufacture of a calcium-magnesium carbonate product, the steps of separately forming two slurries, one being of magnesium hydroxide and water and the other being a slurry of calcium hydroxide in water, mixing the slurries together, contacting the mixture with carbon dioxide gas at atmospheric pressure while the temperature of the same is below 60° C., and then expanding the mixture by heat to form a carbonate, said last two steps being carried out in the absence of a catalyst like ammonia.

6. In a process for the manufacture of a calcium-magnesium carbonate product, separately forming two slurries, one being of purified magnesium hydroxide and water and the other being a slurry of finely divided calcium hydroxide in water, mixing the slurries together, contacting the mixture with carbon dioxide gas at atmospheric pressure, and then heating the carbonated mixture to form a carbonate.

ROBERT E. CLARKE.